(12) United States Patent
Yoshida

(10) Patent No.: US 7,739,609 B2
(45) Date of Patent: Jun. 15, 2010

(54) METHOD AND SYSTEM FOR RESPONDING TO INQUIRIES FROM USERS

(75) Inventor: Ryo Yoshida, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 11/612,024

(22) Filed: Dec. 18, 2006

(65) Prior Publication Data

US 2007/0150618 A1    Jun. 28, 2007

(30) Foreign Application Priority Data

Dec. 28, 2005    (JP) .............................. 2005-377285

(51) Int. Cl.
*G06F 3/00*       (2006.01)
*G06F 15/16*      (2006.01)
*G06F 15/173*     (2006.01)
*G06F 9/46*       (2006.01)
*G06Q 10/00*      (2006.01)

(52) U.S. Cl. ...................... 715/752; 709/206; 709/224; 705/1; 705/9

(58) Field of Classification Search ...................... 705/9
See application file for complete search history.

(56) References Cited

U.S. PATENT DOCUMENTS

| | | | | |
|---|---|---|---|---|
| 5,884,032 | A * | 3/1999 | Bateman et al. | 709/204 |
| 5,954,798 | A * | 9/1999 | Shelton et al. | 709/224 |
| 6,035,332 | A * | 3/2000 | Ingrassia et al. | 709/224 |
| 6,061,741 | A * | 5/2000 | Murphy et al. | 709/248 |
| 6,097,964 | A * | 8/2000 | Nuovo et al. | 455/566 |
| 6,295,551 | B1 * | 9/2001 | Roberts et al. | 709/205 |
| 6,567,848 | B1 * | 5/2003 | Kusuda et al. | 709/219 |
| 7,003,550 | B1 * | 2/2006 | Cleasby et al. | 709/205 |
| 7,027,585 | B2 * | 4/2006 | Dezonno | 379/265.09 |
| 7,139,978 | B2 * | 11/2006 | Rojewski et al. | 715/744 |
| 2001/0054064 | A1 * | 12/2001 | Kannan | 709/203 |
| 2002/0046281 | A1 * | 4/2002 | Cope | 709/227 |
| 2002/0065912 | A1 * | 5/2002 | Catchpole et al. | 709/224 |
| 2003/0135566 | A1 * | 7/2003 | Nishiguchi et al. | 709/206 |

(Continued)

FOREIGN PATENT DOCUMENTS

JP    PUPA2001-051876    2/2001

(Continued)

*Primary Examiner*—Tadesse Hailu
*Assistant Examiner*—Nicholas S Ulrich
(74) *Attorney, Agent, or Firm*—Ronald Kaschak; Shimokaji & Associates, P.C.

(57) ABSTRACT

A method for responding to inquiries from a user by a response support system. A request displaying a second screen is received from a user terminal of the user in which a first screen is being displayed. An inquiry destination of the response support system is identified in the first screen. Screen data pertaining to the second screen and containing an operation object is retrieved. The second screen is configured to be sent to the inquiry destination in response to an operation performed on the operation object by the user. Screen transition information containing screen identifiers of screens previously displayed by the user terminal, including the first screen, is retrieved. The second screen is assembled by inserting the retrieved screen data and the retrieved screen transition information into the second screen. The assembled second screen is sent to the user terminal.

1 Claim, 12 Drawing Sheets

U.S. PATENT DOCUMENTS

| | | | |
|---|---|---|---|
| 2004/0015559 A1* | 1/2004 | Goldstein | 709/217 |
| 2005/0132018 A1* | 6/2005 | Milic-Frayling et al. | 709/213 |
| 2005/0203882 A1* | 9/2005 | Godley | 707/3 |

FOREIGN PATENT DOCUMENTS

| | | | |
|---|---|---|---|
| JP | PUPA2002-152389 | 5/2002 | |
| JP | PUPA2004-013525 | 1/2004 | |
| JP | PUPA2004-015763 | 1/2004 | |
| JP | PUPA2004-318734 | 11/2004 | |

\* cited by examiner

FIG. 3

| LOGIN ID | PAGE ID LIST |
|---|---|
| ⋮ | ⋮ |
| AAAAAA | ⋯, XX0101, XX0102, ⋯, XX0201, XX0202 |
| BBBBBB | ⋯, YY0211, YY0212, ⋯, YY0315, YY0316 |
| CCCCCC | ⋯, ZZ0154 |
| DDDDDD | ⋯, WW0312, WW0362 |
| ⋮ | ⋮ |

```
1:<html>
   :
2:<form action="button.html">
3:<button name="Help" type="button"
4:  value="button"
5:  onClick="self.location.href='mailto:
6:  helpdesk@△△△.com?subject="…"
7:  body="…">
8:<img src="button.jpg">
9:</button>
10:</form>
   :
11:</html>
```

FIG. 10

FORWARDED EMAIL MESSAGE:

From: helpdesk@△△△.com

To: mobile_phone_model4@△△△.com subject: PRODUCT LIST-XX0101-····-XX0202 body:

INITIAL SCREEN URL : http://△△△.XX/top.html

REPRODUCED SCREEN URL : http://△△△.XX/p0101.html

FAQ LIST: Q.: SCREEN IS NOT DISPLAYED.
A.: IS THE POWER ON?

⋮

Q.: SCREEN DISPLAY DOES NOT CHANGE.
A.: IS THE INTENSITY OF RADIO WAVES HIGH ENOUGH?

INQUIRY: I WAS DISCONNECTED HALFWAY THROUGH. IS THIS COMPLETED?

METHOD AND SYSTEM FOR RESPONDING TO INQUIRIES FROM USERS

FIELD OF THE INVENTION

The present invention relates to a method and system for responding to inquiries from users.

BACKGROUND OF THE INVENTION

Today, mail-order services and movie and music distribution services via websites are becoming widespread. As a result, general consumers, as well as computer specialists, have more and more opportunities to access websites. Website operators conventionally provide help desks as points of contact for users with problems. For example, a web page provides email addresses along with a message such as "Contact us".

However, it is difficult for general consumers to correctly understand the operating conditions of web applications and create an email message which accurately describes the conditions. Therefore, a person at a help desk having received an email message cannot properly understand the problem the user has.

Thus there is a need for a method and system that responds to inquiries from users that is more efficient than existing methods and systems.

SUMMARY OF THE INVENTION

The present invention provides a method for responding to inquiries from a user by a response support system, said method comprising:

receiving from a user terminal of the user in which a first screen is being displayed, a request for displaying a second screen, an inquiry destination of the response support system being identified in the first screen;

after said receiving the request for displaying the second screen, retrieving screen data pertaining to the second screen, said retrieved screen data comprising an operation object, wherein the second screen is configured to be sent to the inquiry destination in response to an operation performed on the operation object by the user;

after said receiving the request for displaying the second screen, retrieving screen transition information comprising an identifier of each screen of at least one screen displayed by the user terminal prior to said receiving the request for displaying the second screen, said at least one screen comprising the first screen;

assembling the second screen, said assembling the second screen comprising inserting the retrieved screen data and the retrieved screen transition information into the second screen; and sending the assembled second screen to the user terminal, wherein said receiving the request for displaying the second screen, said retrieving the screen data pertaining to the second screen, said retrieving the screen transition information, said assembling the second screen, and said sending the assembled second screen to the user terminal are performed by the response support system.

The present invention provides a method and system that responds to inquiries from users that is more efficient than existing methods and systems.

BRIEF DESCRIPTION OF THE DRAWINGS

FIG. 3 illustrates an exemplary data structure in the history recording unit of the web server of FIG. 2, in accordance with embodiments of the present invention.

FIG. 4 illustrates an exemplary data structure in the webpage recording unit of the web server of FIG. 2, in accordance with embodiments of the present invention.

FIG. 10 illustrates an exemplary email message to be forwarded by the mail receiving server of FIG. 9, in accordance with embodiments of the present invention.

DETAILED DESCRIPTION OF THE INVENTION

Figure 1:
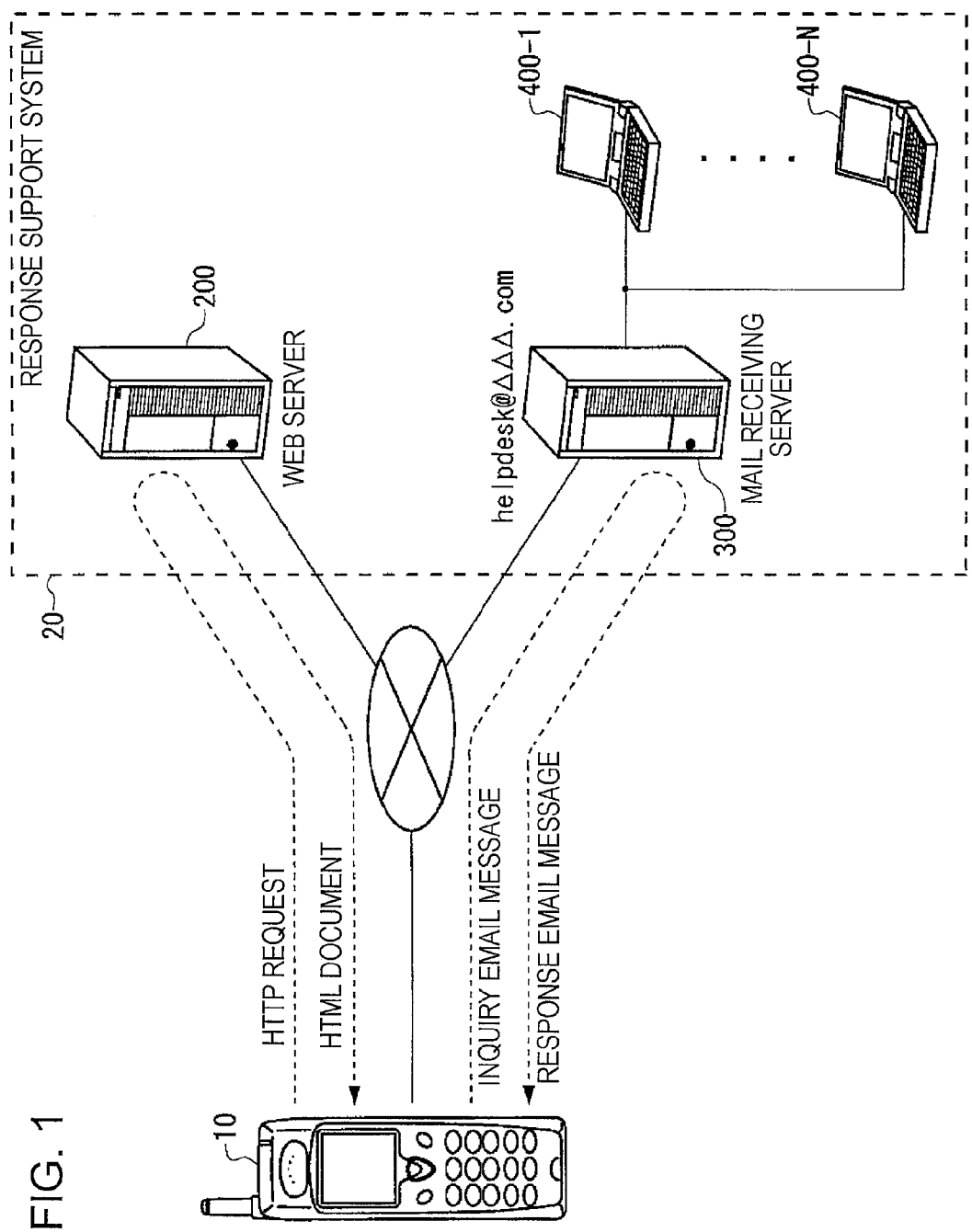
FIG. 1 illustrates the overall configuration of a response support system that comprises a web server, in accordance with embodiments of the present invention.

FIG. 1 illustrates the overall configuration of a response support system 20, in accordance with embodiments of the present invention. The response support system 20 includes a web server 200, a mail receiving server 300, and operator (agent) terminals 400-1 through 400-N. The web server 200 functions as an information site with a plurality of screens. While a first screen is being displayed in a user terminal 10, the web server 200 receives from the user terminal 10 a request for displaying a second screen, which is subsequent to the first screen. The first and second screens are, for example, web pages in hypertext markup language (HTML) format. The request for displaying the second screen may be, for example, a hypertext transfer protocol (HTTP) request for displaying a web page. In response to the receipt of this request, the web server 200 sends to the user terminal 10 the second screen requested to be displayed.

The mail receiving server 300 receives an inquiry about a web page displayed on the screen of the user terminal 10 from the user terminal 10 in the form of an email message. The destination address of the email message is presented on the displayed web page. The user sends the email message to the destination address (e.g., helpdesk@ΔΔΔ.com). Alternatively, the mail receiving server 300 may receive a parameter as an inquiry, the parameter being submitted from the user terminal 10 to a program, such as a common gateway interface (cgi), run by the mail receiving server 300. The mail receiving server 300 forwards the received email message to one of the operator terminals 400-1 through 400-N according to the content of the email message. The operator terminals 400-1 through 400-N are provided in correspondence with respective operators who respond to inquiries about the web page. Each of the operator terminals 400-1 through 400-N sends a response input by its corresponding operator to the user terminal 10 in the form of an email message.

The mail receiving server 300 and the operator terminals 400-1 through 400-N are provided in a so-called help desk that is a department specialized in troubleshooting. In the help desk, a plurality of operators are assigned, for example, according to who is responsible for which model of the user terminal 10, and handle inquiries from users. Today, as services using web systems become widespread and competition among the services intensifies, help desks are expected to provide precise and prompt responses to inquiries from users. At the same time, various models of the user terminal 10, such as a mobile phone, are becoming available to meet diversifying demands. Moreover, the types of users and their inquiries are diversifying, and inquiry messages are getting shorter due to the shrinking display screen size of the user terminal 10. Therefore, there are more and more cases where operators cannot understand inquiries, and even if they can, it often takes a long time to prepare responses to the inquiries.

The response support system 20 according to an embodiment of the present invention is designed to help an operator understand an inquiry and prepare a response to the inquiry by automatically inserting, into the inquiry email message, information useful for understanding the inquiry, thereby improving efficiency in the operation of help desks.

Figure 2:
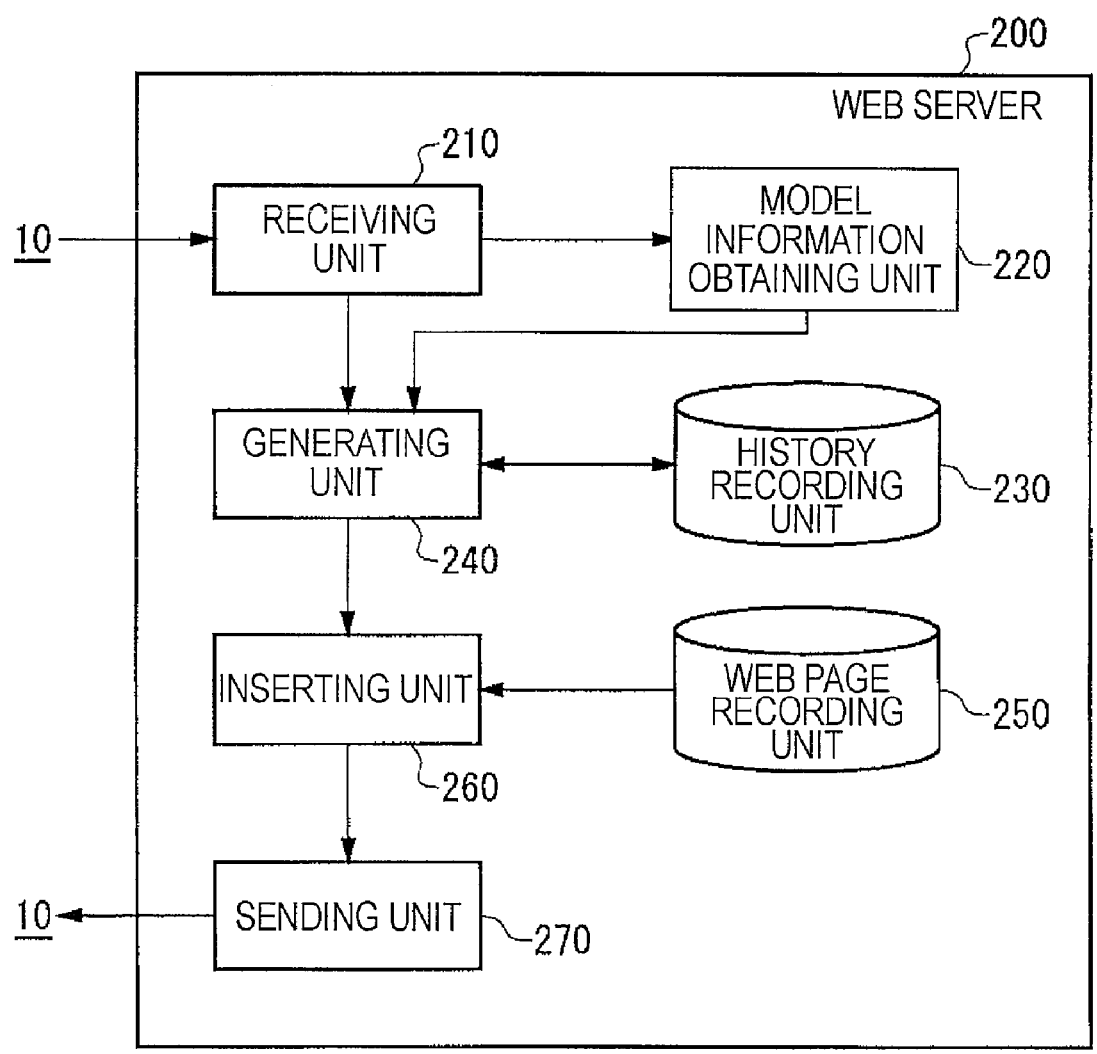
FIG. 2 illustrates a functional configuration of the web server of FIG. 1, in accordance with embodiments of the present invention.

FIG. 2 illustrates a functional configuration of the web server 200 of FIG. 1, in accordance with embodiments of the present invention. The web server 200 includes a receiving unit 210, a model-information obtaining unit 220, a history recording unit 230, a generating unit 240, a web-page recording unit 250, an inserting unit 260, and a sending unit 270. The receiving unit 210 receives, from the user terminal 10 in which a first screen is being displayed, a request for displaying a second screen containing an operation object to be used by the user of the user terminal 10 to make an inquiry. The model-information obtaining unit 220 obtains model information for identifying the model of the user terminal 10 that has sent the request for displaying the second screen. The model information may be embedded in an HTTP request by, for example, a gateway server for relaying communication between the user terminal 10 and the web server 200. In this case, the model-information obtaining unit 220 obtains model information from the HTTP request.

Figure 12:
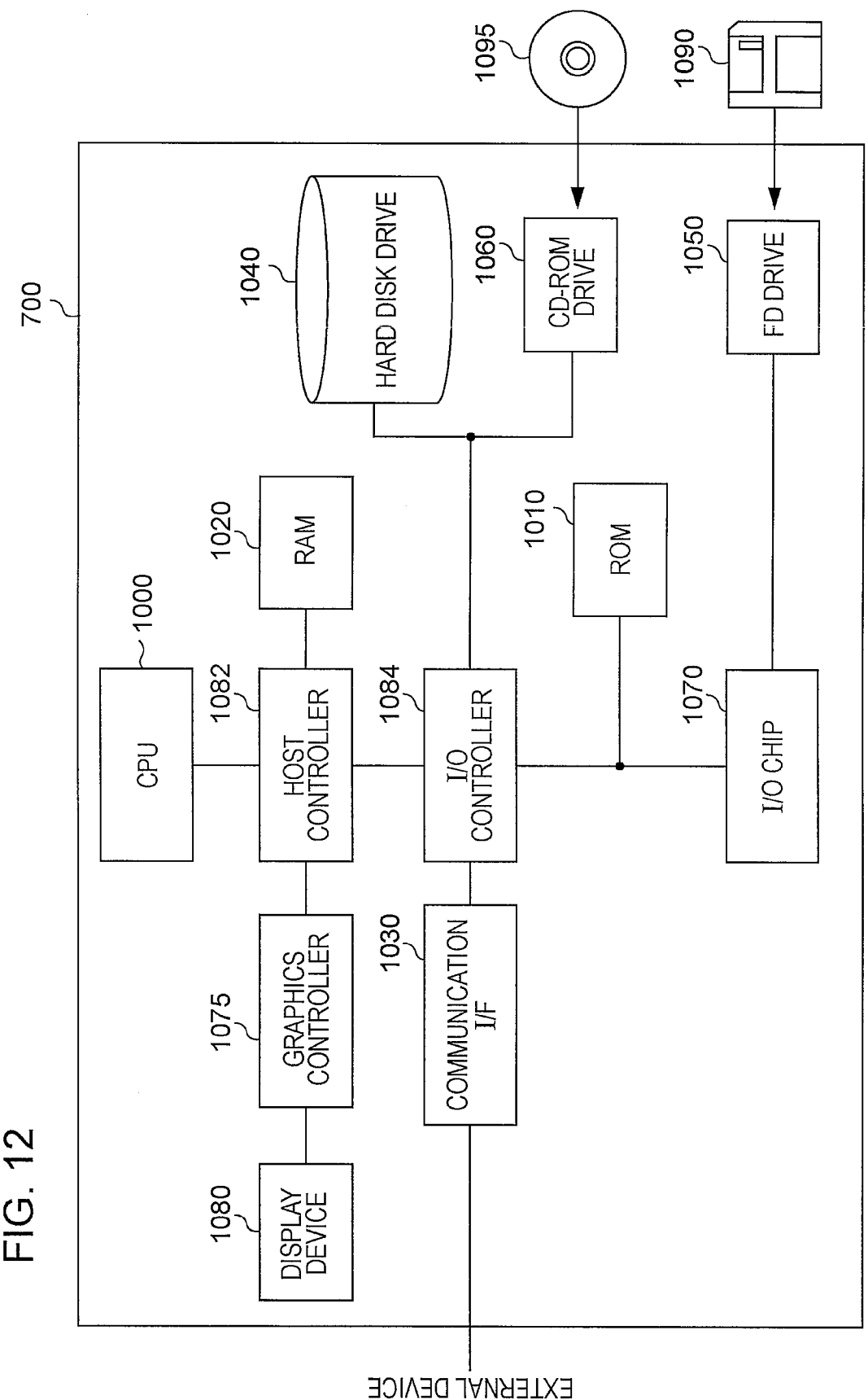
FIG. 12 illustrates an exemplary hardware configuration of an information processing apparatus functioning as the web server of FIG. 1 or the mail receiving server of FIG. 9, in accordance with embodiments of the present invention.

The history recording unit 230 records in a storage medium such as the hard disk 1040 of FIG. 12, with respect to each user, a collection of pieces of identification information for one or more screens previously and sequentially displayed in a terminal apparatus of the user. For example, the history recording unit 230 records identification information for the first screen currently displayed in the user terminal 10, and identification information for another screen displayed in the user terminal 10 before the first screen is displayed. The generating unit 240 uses at least the identification information for the first screen to generate screen transition information representing the transition of screens displayed in the user terminal 10. Specifically, in response to the receipt of a request for displaying a screen from the user terminal 10, the generating unit 240 may retrieve, from the history recording unit 230, a collection of pieces of identification information corresponding to the user of the user terminal 10 to generate the screen transition information. In this case, the generating unit 240 adds identification information for the newly requested second screen to the retrieved screen transition information, and causes the history recording unit 230 to record the resulting information.

The web-page recording unit 250 records, in correspondence with identification information for each corresponding screen, each of a plurality of pieces of screen data for sequentially displaying web pages in the user terminal 10. Screen data is, for example, an HTML document described in HTML. In other words, screen data may contain not only information for defining the content and design of display, but also an operation object, such as a button or a slide bar, for accepting the operation of the user.

In response to the request received by the receiving unit 210, the inserting unit 260 inserts screen transition information into the second screen requested to be displayed. Specifically, the inserting unit 260 inserts the screen transition information into the second screen such that the screen transition information is sent to an inquiry destination in response to an operation performed on the operation object by the user. For example, the inserting unit 260 may insert a character string representing screen transition information as an attribute value for a "subject" attribute in a "mailto" tag in HTML. Alternatively, the inserting unit 260 may insert a character string representing screen transition information as a default value in an HTML input form, and specify the character string as a parameter to be input to a cgi program by submission. The sending unit 270 sends, to the user terminal 10, screen data into which screen transition information has been inserted.

FIG. 3 illustrates an exemplary data structure in the history recording unit 230 of the web server 200 of FIG. 2, in accordance with embodiments of the present invention. The history recording unit 230 records login IDs as identification information for users. Login IDs are IDs registered by users for using application programs provided by the response support system 20. A login ID is, for example, included in an HTTP request and sent to the web server 200. By referring to the HTTP request, the web server 200 can identify the user from which the HTTP request has been sent.

The history recording unit 230 records, in correspondence with a login ID of a user, a collection of pieces of identification information for one or more screens previously and sequentially displayed in a terminal apparatus of the user. For example, "..., XX0101, XX0102, ..., XX201, XX0202" are recorded in correspondence with a user with a login ID "AAAAAA". This indicates that a screen with identification information "XX0101" and a screen with identification information "XX0102" were sequentially displayed in a terminal screen of this user and then, after other screens were sequentially displayed, a screen with identification information "XX0202" was sequentially displayed. The first two letters of identification information may be identifiers for identifying application programs.

Every time a request for displaying a screen is received from a user, the generating unit 240 retrieves a list of identification information corresponding to a login ID of the user from the history recording unit 230, adds identification information for the requested screen to the list, and records the resulting list in the history recording unit 230. In this manner, in response to the receipt of a request for displaying a screen, the history recording unit 230 sequentially adds and records identification information for the screen.

FIG. 4 illustrates an exemplary data structure in the web-page recording unit 250 of the web server 200 of FIG. 2, in accordance with embodiments of the present invention. The web-page recording unit 250 records each of screen data 255-1 through 255-N in correspondence with the corresponding identification information. The screen data 255-1 is exemplary screen data for a screen with identification information "XX0202". In this screen data described in HTML, "html" tags in the first and eleventh lines tell the user terminal 10 to read the HTML document. Series of commands in the second through tenth lines specify an operation object to be placed on the display screen to be displayed on the basis of the screen data 255-1.

A command in the eighth line specifies an image file of an image to be displayed as the operation object on the screen. That is, an image file with a file name "button.jpg" is read and displayed on the screen of the user terminal 10. The third line describes the type of operation that can be accepted by the operation object. A "button" tag in the third line indicates that the operation object can accept the press of a button.

Moreover, processing to be executed in response to an operation performed on the operation object by the user is specified by series of commands in the third to seventh lines. A command in the fifth and sixth lines is a "mailto" tag in HTML. The fifth and sixth lines indicate that software for editing an inquiry email message is started when the operation object is clicked, and the destination of the message is "helpdesk@ΔΔΔ.com". A parameter 257 in the sixth line and a parameter 259 in the seventh line are parameters to be sent to the destination of the inquiry in response to an operation performed on the operation object by the user. The parameter 257 in the sixth line is an attribute value for a "subject" attribute to be given to the "mailto" tag, and indicates a character string to appear in the subject field of the email message. The parameter 259 in the seventh line is an attribute value for a "body" attribute to be given to the "mailto" tag, and indicates a character string to appear in the body of the email message. The inserting unit 260 can insert screen transition information into the inquiry email message by placing the screen transition information at the position of the parameter 257 or 259.

Figure 5:
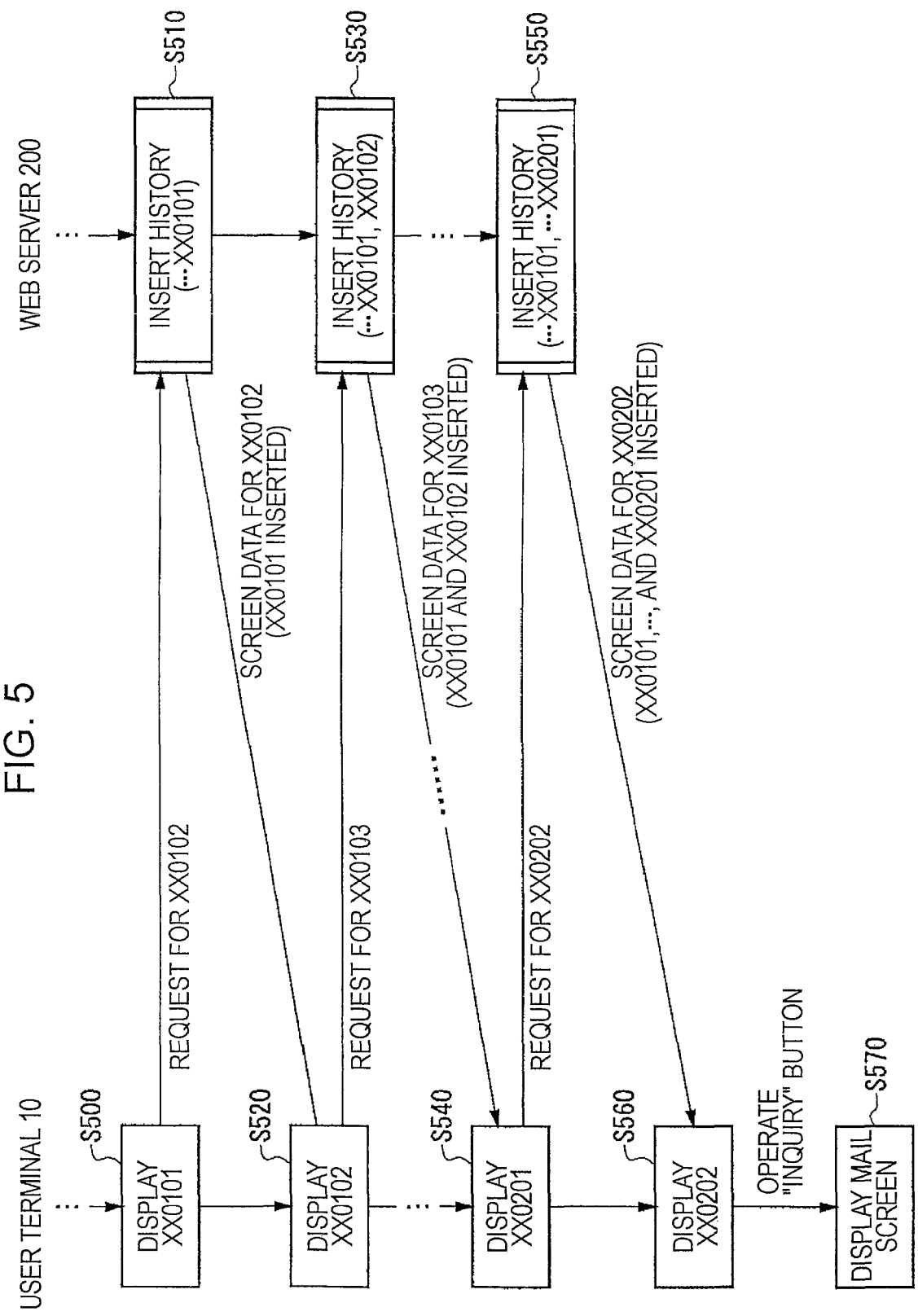
FIG. 5 illustrates a processing flow in which the web server of FIG. 2 sequentially displays web pages on the screen of the user terminal of FIG. 1, in accordance with embodiments of the present invention.

FIG. 5 illustrates a processing flow in which the web server 200 sequentially displays web pages on the screen of the user terminal 10, in accordance with embodiments of the present invention. At the start of the processing in FIG. 5, a screen with identification information "XX0101" (hereinafter referred to as screen XX0101, and the same applies to the other screens) is displayed in the user terminal 10. At the same time, the history recording unit 230 in the web server 200 records "XX0101" as screen transition information. While the screen XX0101 is being displayed, the user terminal 10 sends a request for screen data for a screen XX0102 to the web server 200 on the basis of the operation performed by the user (step S500).

Upon receipt of the request for displaying a screen, the web server 200 inserts screen transition information into screen data for the screen requested to be displayed, and sends the screen data to the user terminal 10 (step S510). Specifically, the identification information "XX0101" is inserted as screen transition information into this screen data. In association with the transmission of screen data, the web server 200 adds identification information for the screen requested to be displayed, that is, "XX0102" to the history recording unit 230.

The user terminal 10 displays the screen XX0102 on the basis of the received screen data. While the screen XX0102 is being displayed, the user terminal 10 sends a request for screen data for a screen XX0103 to the web server 200 on the basis of the operation performed by the user (step S520). Upon receipt of the request for the screen data, the web server 200 inserts screen transition information into the requested screen data and sends the screen data to the user terminal 10 (step S530). The identification information "XX0101" and "XX0102" is inserted as screen transition information into this screen data.

In the way described above, the user terminal 10 sequentially sends requests and displays a plurality of screens. While a screen XX0201 is being displayed, the user terminal 10 sends a request for screen data for a screen XX0202 to the web server 200 on the basis of the operation performed by the user (step S540). Upon receipt of the request for the screen data, the web server 200 inserts screen transition information into the requested screen data and sends the screen data to the user terminal 10 (step S550). The identification information "XX0101", "XX0102", . . . and "XX0201" is inserted as screen transition information into this screen data.

The user terminal 10 displays a screen XX0202 on the basis of the received screen data (step S560). While the screen XX0202 is being displayed, in response to an operation performed by the user on the operation object within the display screen, the user terminal 10 displays an editing screen for editing an email message (step S570). The screen transition information previously inserted into the screen data in step S550 appears as the subject of this email message. When the user describes and sends out the content of an inquiry in the body field of this email message, the screen transition information is also sent to the mail receiving server 300 along with the content of the inquiry.

Figure 6:
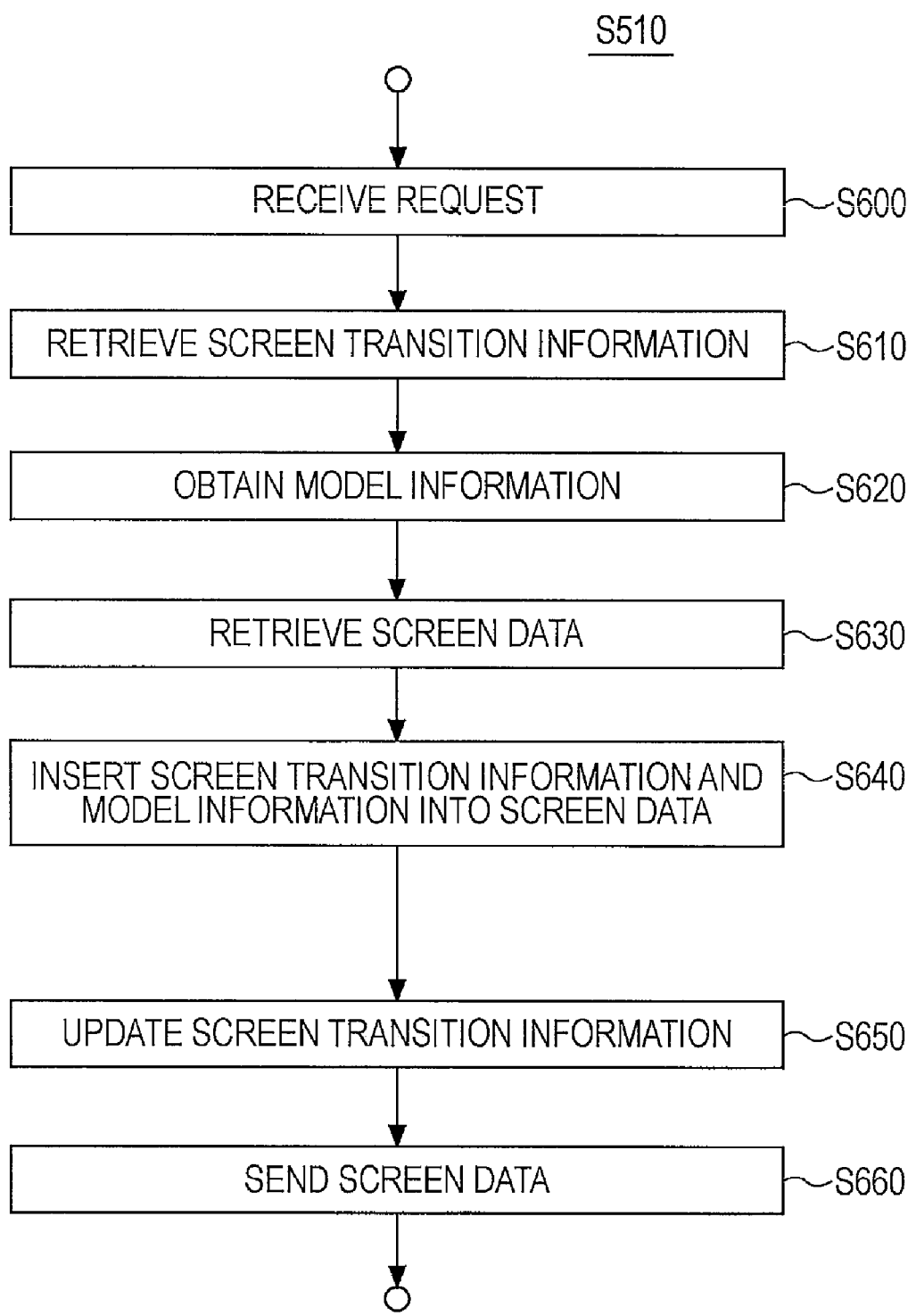
FIG. 6 illustrates details of processing in step S510 of FIG. 5, in accordance with embodiments of the present invention.

FIG. 6 illustrates details of processing in step S510 of FIG. 5, in accordance with embodiments of the present invention. FIG. 6 illustrates step S510 as a representative of steps S510, S530, and S550. First, the receiving unit 210 receives, from the user terminal 10 in which a first screen is being displayed, a request for displaying a second screen containing an operation object for the user to make an inquiry (step S600). In response to the receipt of the request for displaying the second screen, the generating unit 240 retrieves a collection of pieces of identification information (containing identification information for the first screen) corresponding to the user of the user terminal 10 from the history recording unit 230 to generate screen transition information (step S610). Alternatively, the generating unit 240 may retrieve a collection of pieces of identification information corresponding to the user from the history recording unit 230 to use, of the retrieved identification information, identification information for a predetermined number of most recently displayed screens to generate screen transition information. In this case, only information useful for preparing a response can be attached to an email message. At the same time, it is possible to prevent the lack of necessary information due to a restriction on the number of characters that can be contained in the subject field.

The model-information obtaining unit 220 obtains model information for identifying the model (type) of the user terminal 10 that has sent a request for displaying the second screen (step S620). The inserting unit 260 retrieves, from the web-page recording unit 250, screen data for the screen having been requested to be displayed (step S630). Then, the inserting unit 260 inserts screen transition information and model information into this retrieved screen data (step S640). Additionally, the inserting unit 260 may use identification information for the second screen having been newly requested to be displayed to generate screen transition information representing transition from the first screen to the second screen, and insert the screen transition information into the screen data described above. Next, the generating unit 240 adds the identification information for the second screen to the screen transition information retrieved from the history recording unit 230 and causes the history recording unit 230 to record the resulting screen transition information (step S650). As a result, the second screen has been assembled such that the assembled second screen comprises the screen data to which the screen transition information has been added. Then, the sending unit 270 sends to the user terminal 10 the assembled second screen into which the screen transition information has been inserted (step S660).

The processing order of step S640 and step S650 may be reversed. In other words, for example, the generating unit 240 adds the identification information for the second screen having been newly requested to be displayed to the screen transition information retrieved from the history recording unit 230, and causes the history recording unit 230 to record the resulting screen transition information. Then, the generating unit 240 retrieves the collection of pieces of recorded identification information to generate screen transition information. In this case, the screen transition information further includes information representing transition from the first screen to the second screen. In other words, it is only necessary that the screen transition information include at least identification information for one or more screens displayed in the user terminal 10 before an inquiry is made, or include only part of identification information for previously displayed screens, depending on the usage at the help desk.

Figure 7:
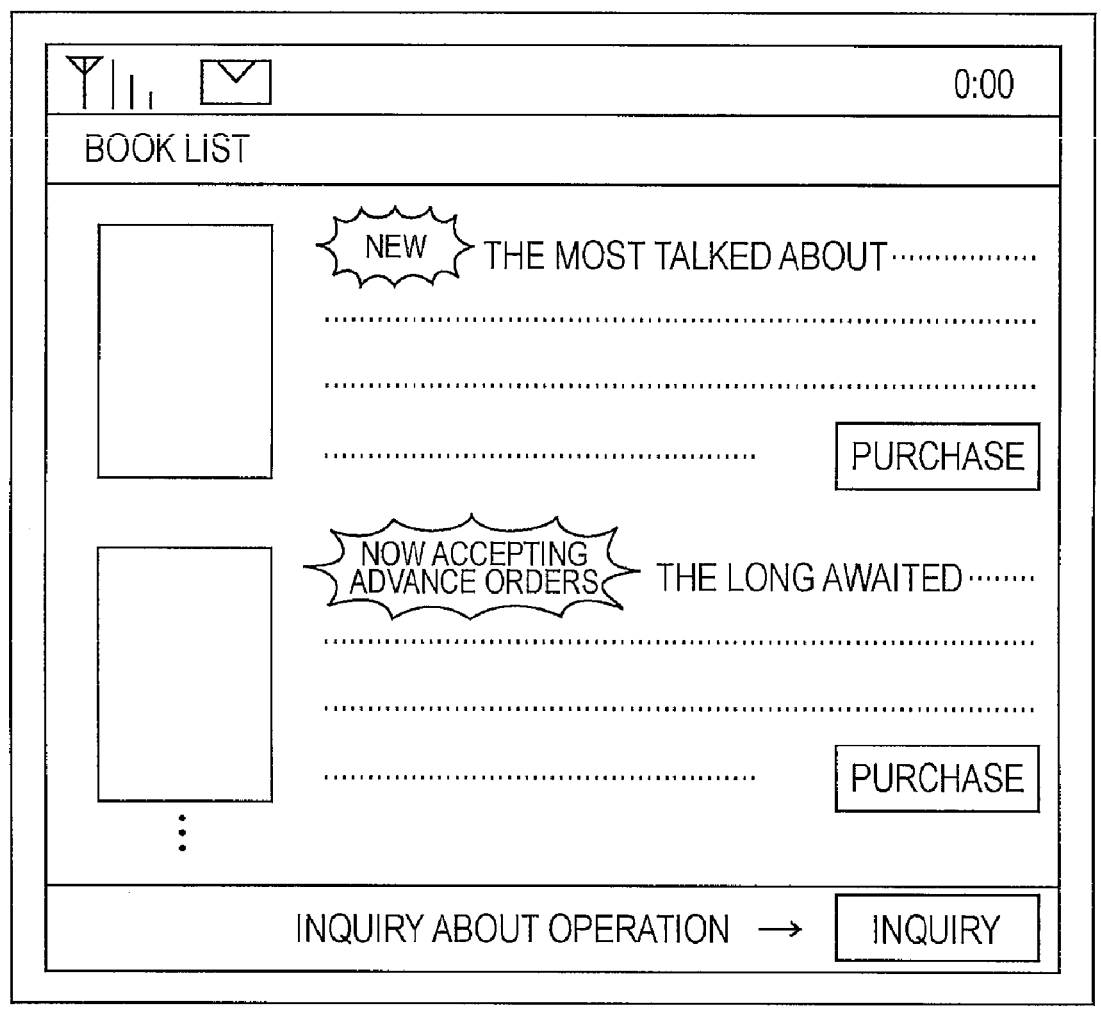
FIG. 7 illustrates an exemplary screen displayed in step S560 of FIG. 5, in accordance with embodiments of the present invention.

FIG. 7 illustrates an exemplary screen displayed in step S560 of FIG. 5, in accordance with embodiments of the present invention. If the user terminal 10 is a mobile phone, the user terminal 10 displays the intensity of radio waves from a base station, the indication of the presence of received email messages, and the current time at the top of the screen. At the same time, the user terminal 10 displays a web page based on screen data received from the web server 200 in the middle of the screen. In the example illustrated in FIG. 7, information about books sold by mail order is displayed. Images, text, and operation objects, such as "purchase" buttons, are displayed on the web page. The user terminal 10 displays an "inquiry" button at the bottom of the screen. This button is an operation object of the present invention. In response to an operation performed on this button by the user, the user terminal 10 starts software for editing email messages.

Figure 8:
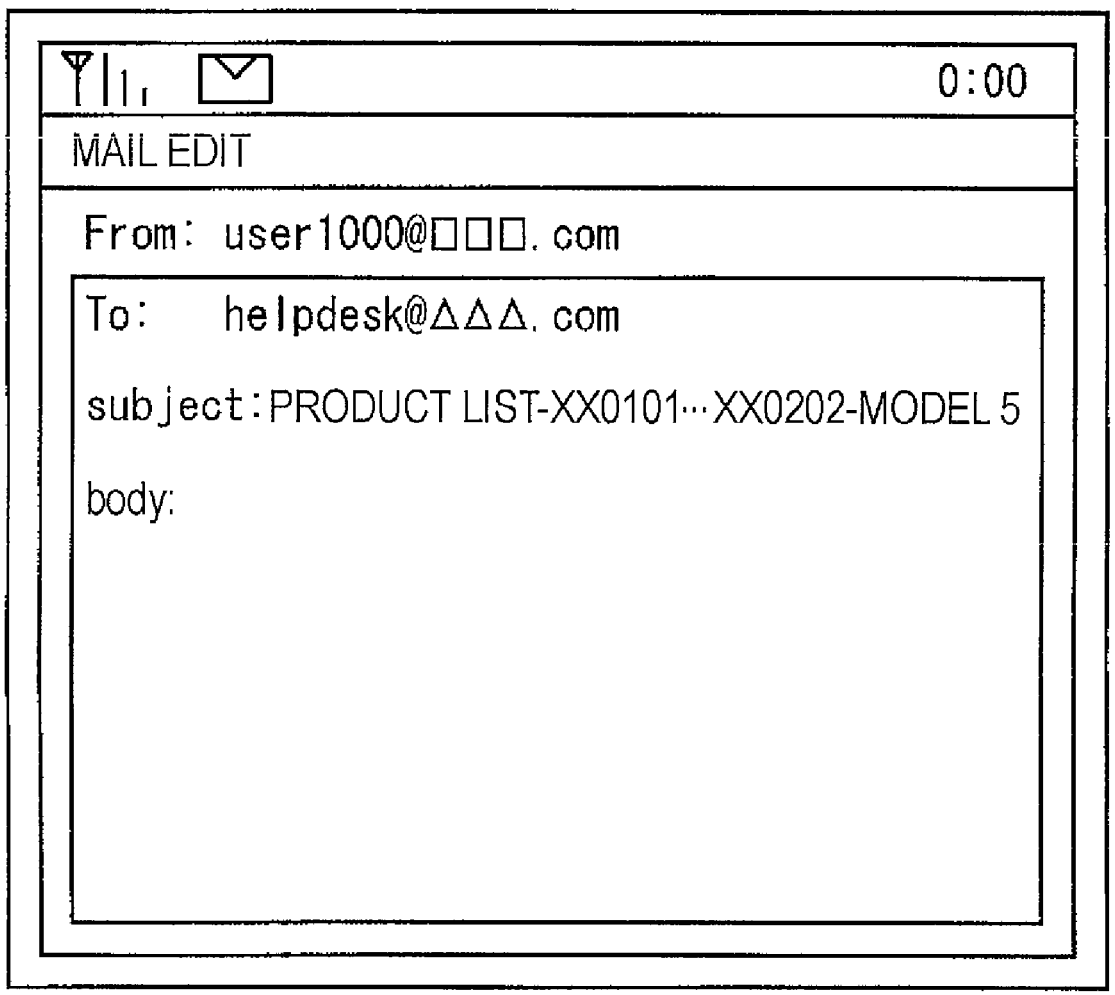
FIG. 8 illustrates an exemplary screen displayed in step S570 of FIG. 5, in accordance with embodiments of the present invention.

FIG. 8 illustrates an exemplary screen displayed in step S570 of FIG. 5, in accordance with embodiments of the present invention. When the software for editing email messages is started, the user terminal 10 displays the subject and message body as well as the addresses of the sender (in the "From" field) and recipient (in the "To" field) on the screen. The subject field contains by default the name of the second screen newly requested to be displayed, screen transition information, and model information having been inserted by the inserting unit 260. For example, by default, the subject field contains the name of the second screen "Product List" as identification information for the second screen, screen transition information "XX0101 . . . XX0202", and model information "Model 5". In this manner, as for the first screen and its previous screens, screen transition information may be represented by symbols and numbers, while as for the second screen, the screen transition information may be represented by the name of the second screen. When the user uses this editing software to describe the inquiry in the body field and sends the email message, the mail receiving server 300 can obtain useful information, such as screen transition information. Although the user is required to describe the inquiry, no additional operation is needed.

Alternatively, unlike the example illustrated in FIG. 8, model information does not have to appear in the email message when the editing software for editing email messages is started. In other words, model information does not have to be inserted into the web page by the web server 200. In this case, when an email message is received, the mail receiving server 300 may detect model information added by a gateway server during the transmission of the email message, add the detected model information to the email message, and send the email message to one of the operator terminals 400-1 through 400-N. This configuration also allows the operator to identify the model of the user terminal 10.

With the web server 200 illustrated in FIG. 1 through FIG. 8, by inserting information useful for understanding the user environment into the web page in advance, the information can be contained in an email message to be sent by the user. This allows operators at the help desk to properly understand the user environment and facilitates the quick preparation of proper responses. To achieve the response support system 20 of the present embodiment, it is sufficient that if the mail receiving server 300 has a mail receiving facility. Therefore, it is possible to establish a system that is highly compatible with existing facilities and is efficient.

A technique for adding facilities to the mail receiving server 300 to further improve efficiency in the operation of help desks will be described with reference to FIG. 9 through FIG. 11.

Figure 9:
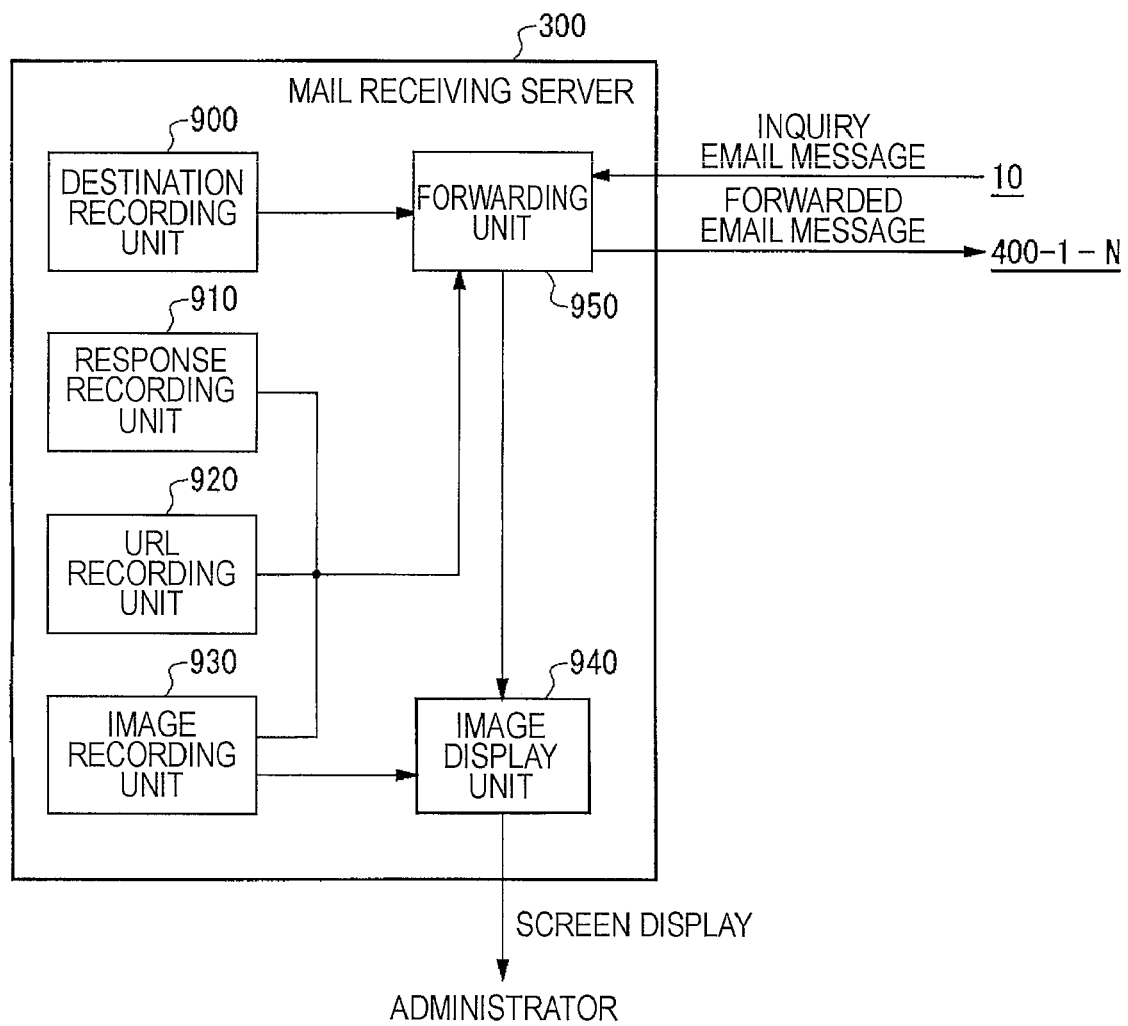
FIG. 9 illustrates a functional configuration of a mail receiving server, in accordance with embodiments of the present invention.

FIG. 9 illustrates a functional configuration of a mail receiving server 300, in accordance with embodiments of the present invention. The mail receiving server 300 is an apparatus for receiving inquiries sent by manipulation of operation objects, and is designed to improve efficiency in help desks by forwarding inquiry email messages to the operator terminals 400-1 through 400-N. The mail receiving server 300 includes a destination recording unit 900, a response recording unit 910, a uniform resource locator (URL) recording unit 920, an image recording unit 930, an image display unit 940, and a forwarding unit 950.

The destination recording unit 900 records, in correspondence with model information for each model, the contact address of an operator who responds to inquiries from a user terminal of the model. For example, model information for Model 1 is recorded in correspondence with the mail address of an operator corresponding to the operator terminal 400-1, and model information for Model 2 is recorded in correspondence with the mail address of an operator corresponding to the operator terminal 400-2. The response recording unit 910 records, in correspondence with each of a plurality of pieces of identification information for respective pieces of screen data, example responses to inquiries about screen data having the identification information. These example responses are called frequently asked questions (FAQs) and include typical examples of inquiries and responses.

The URL recording unit 920 records, in correspondence with identification information for each screen, the URL of the initial screen page of an application program that allows the screen to be displayed. Even if the web server 200 simultaneously executes a plurality of application programs, it is possible to immediately display the initial screen of an application program relating to an inquiry by referring to the Uniform Resource Locator (URL). Additionally, the URL recording unit 920 may record, in correspondence with identification information not only for the initial screen but also for all screens, URLs for displaying the screens. In this case, even a screen to be displayed during the execution of the application program can be instantaneously displayed by selecting a URL corresponding to identification information for the screen.

The image recording unit 930 obtains in advance and records, in correspondence with identification information for each screen, a display image of the screen. In response to the receipt of an inquiry email message by the forwarding unit 950, the image display unit 940 obtains screen transition information from the inquiry. Then, the image display unit 940 obtains from the image recording unit 930 a display image corresponding to each identification information contained in the screen transition information. The image display unit 940 displays the obtained display image, for example, to an administrator of the mail receiving server 300. Additionally, the forwarding unit 950 may display this display image on the image display unit 940, attach the display image as an attachment file to the email message, and send it to one of the operator terminals 400-1 through 400-N.

The forwarding unit 950 retrieves, from the destination recording unit 900, a contact address corresponding to model information contained in the received inquiry email message, and forwards the received inquiry to the retrieved contact address. Although screen transition information is already contained in the inquiry, various types of information for the ease of response may be added to the inquiry. For example, the forwarding unit 950 may retrieve from the URL recording unit 920 the URL of the initial screen corresponding to specific identification information contained in the screen transition information in the received inquiry, and add the retrieved URL to the inquiry.

Moreover, if screen transition information for the most recently displayed screens only is received, the forwarding unit 950 may search identification information contained in the received screen transition information to retrieve a URL corresponding to identification information for the initially displayed screen from the URL recording unit 920, and add the retrieved URL to the inquiry. If the operator who has received this inquiry forwards it to a terminal apparatus of the same model as that of the user terminal 10 and selects the URL added to the inquiry at the terminal apparatus, substantially the same environment as that of the user can be easily created. Additionally, the forwarding unit 950 may retrieve from the response recording unit 910 an example response corresponding to specific identification information contained in the screen transition information in the received inquiry email message, and add the retrieved example response to the inquiry.

Furthermore, the forwarding unit 950 may forward an inquiry about a specific screen to a predetermined operator responsible for responding to inquiries about the screen, on condition that screen transition information contains identification information for the specific screen. Thus, for example, if a new page is added to an application program, it is possible to leave inquiries about the page to an expert who is capable of dealing with such inquiries.

FIG. 10 illustrates an exemplary email message to be forwarded by the mail receiving server 300 of FIG. 9, in accordance with embodiments of the present invention. The forwarding unit 950 changes the destination of the email message from the main address of the help desk "helpdesk@ΔΔΔ.com" to the email address of an operator according to model information. The email address after the change is, for example, "mobile_phone_model4@ΔΔΔ.com". The subject of the received email message is inserted without change into the subject field of this email message.

As shown at the bottom of FIG. 10, the text of the inquiry is attached to the body of the email message. Moreover, the forwarding unit 950 inserts, into the body field of the email message, the URL of the initial screen of the application program and the URL for displaying identification information for the initially displayed screen in screen transition information. In the screen transition information starting at "XX0101" and ends with "XX0202", identification information for the initially displayed screen is "XX0101". Therefore, the forwarding unit 950 inserts the URL of the screen XX0101 into the body field of the email message. Thus, the operator can reproduce the user's environment only by selecting this URL. The forwarding unit 950 may add an FAQ list to the body of this email message. In this case, the operator can use the FAQ list as a reference to prepare a response.

Figure 11:
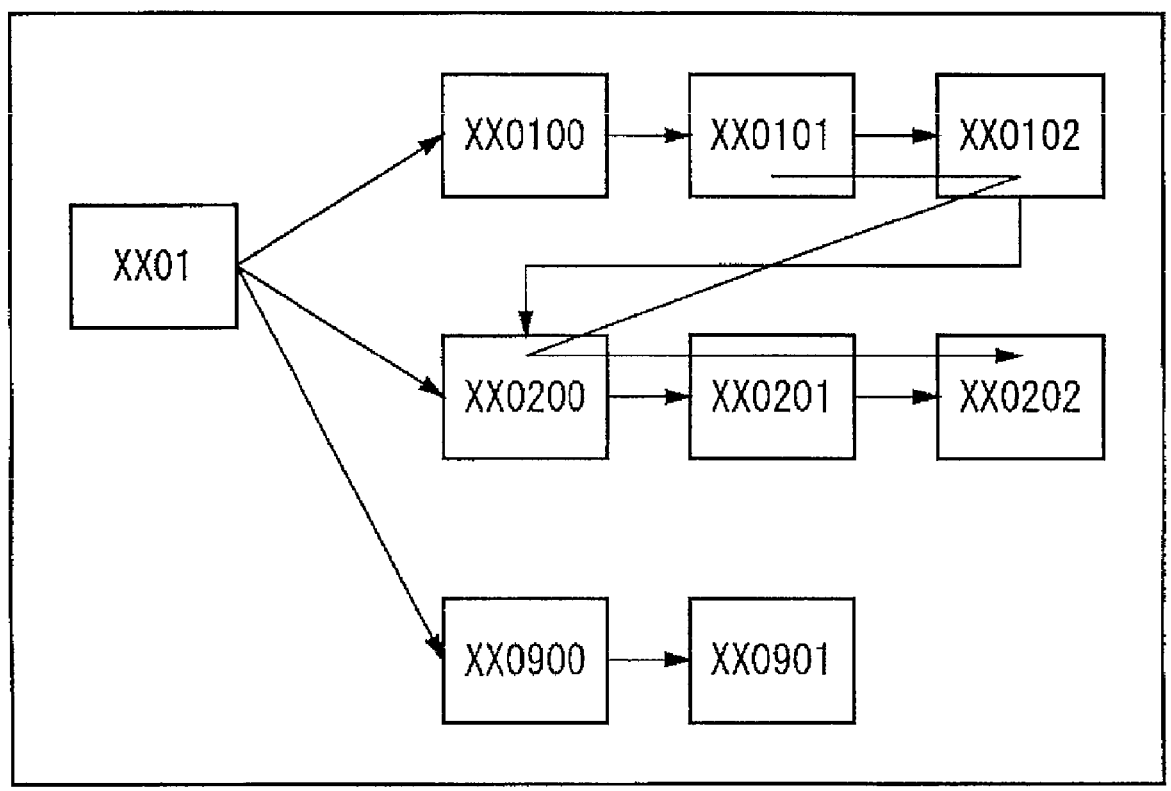
FIG. 11 illustrates an exemplary screen display of the mail receiving server of FIG. 9, in accordance with embodiments of the present invention.

FIG. 11 illustrates an exemplary screen display of the mail receiving server 300 of FIG. 9, in accordance with embodiments of the present invention. Rectangles in FIG. 11 are symbols representing respective screens by including identifiers of the respective screens as shown. For example, the image display unit 940 displays, as the symbols of the screens, display images or their respective thumbnail images of the screens. At the same time, the image display unit 940 overlays identification information for the screens on the images. Moreover, the image display unit 940 displays an arrow that connects a symbol representing a screen with another symbol representing another screen to be subsequently displayed by operation performed on the current screen by the user. Thus, the image display unit 940 displays a screen transition diagram that associates screens with their transition.

The image display unit 940 displays, in FIG. 11, a screen transition diagram comprising a graphical image that describes the screen transition information contained in an inquiry email message. The screen transition information in the graphical image is represented the rectangular symbols and an arrow between the rectangular symbols shown in FIG. 11. In other words, the arrow in FIG. 11 indicates that the screen transition information contains "XX0101", "XX0102", "XX0200", "XX0201", and "XX0202" in this order. The screen display illustrated in FIG. 11 allows the operator to instantaneously identify, in the overall process of screen transition, the location of the screen about which the user has made an inquiry, and can be used by the operator to prepare a response.

The screen display described above may either be displayed by the image display unit 940 to an administrator, or added by the forwarding unit 950 to an inquiry email message and sent to one of the operator terminals 400-1 through 400-N.

The configuration illustrated in FIG. 9 through FIG. 11 allows received email messages to be automatically sorted by model and forwarded. Moreover, information useful for preparing a response to an inquiry can be automatically added to an inquiry email message. Thus, it is possible to enhance efficiency in the operation of help desks.

FIG. 12 illustrates an exemplary hardware configuration of an information processing apparatus 700 functioning as the web server 200 of FIG. 1 or the mail receiving server 300 of FIG. 9, in accordance with embodiments of the present invention. The information processing apparatus 700 includes a processor, namely a central processing unit (CPU) 1000, and its peripheral devices, including a random-access memory (RAM) 1020, and a graphics controller 1075, which are connected to one another by a host controller 1082; an input/output section including a communication interface 1030, a hard disk drive 1040, and a compact-disk read-only memory (CD-ROM) drive 1060 that are connected through an input/output controller 1084 to the host controller 1082; and a legacy input/output section including a ROM 1010, a flexible disk drive 1050, and an input/output chip 1070 that are connected to the input/output controller 1084.

The host controller 1082 connects the RAM 1020 with the CPU 1000 and the graphics controller 1075 that access the RAM 1020 at a high transmission rate. The CPU 1000 operates on the basis of programs stored in the ROM 1010 and the RAM 1020 to control to each part. The graphics controller 1075 obtains image data generated by the CPU 1000 or the like on a frame buffer in the RAM 1020, and displays the obtained image data on a display device 1080. Alternatively, the graphics controller 1075 may include a frame buffer in which image data generated by the CPU 1000 or the like is to be stored.

The input/output controller 1084 connects the host controller 1082 with the communication interface 1030, the hard disk drive 1040, and the CD-ROM drive 1060 that are relatively high speed input/output devices. The communication interface 1030 communicates with external devices via a network. A data storage medium such as the hard disk drive 1040 stores programs and data to be used by the information processing apparatus 700 or the mail receiving server 300. The hard disk drive 1040 is an example of a computer-readable data storage medium that may be used to store all program code and data used by the program code in accordance with the embodiments of the present invention described herein. The CD-ROM drive 1060 reads a program and/or data from a CD-ROM 1095 and provides it to the RAM 1020 or the hard disk drive 1040. The CD-ROM 1095 is an example of a computer program product, comprising a computer usable medium having a computer readable program code embodied therein, said computer readable program code configured to implement the methods of the present invention when executed by a processor (e.g., the CPU 1000) of a computer system comprising the information processing apparatus 700.

The ROM 1010 and relatively low speed input/output devices, such as the flexible disk drive 1050 and the input/output chip 1070, are connected to the input/output controller 1084. The ROM 1010 stores a boot program to be executed by the CPU 1000 when the information processing apparatus 700 starts, and hardware dependent programs for the information processing apparatus 700. The flexible disk drive 1050 reads a program or data from a flexible disk 1090 and provides it via the input/output chip 1070 to the RAM 1020 or the hard disk drive 1040. The input/output chip 1070 connects various input/output devices via the flexible disk 790 or, for example, via a parallel port, a serial port, a keyboard port, or a mouse port.

A program to be provided by a user to the information processing apparatus 700 is stored in a recording medium, such as the flexible disk 1090, the CD-ROM 1095, or an integrated circuit (IC) card. The program is read from the recording medium and installed in the information processing apparatus 700 via the input/output chip 1070 and/or the input/output controller 1084, and executed. Since operations that the program causes the information processing apparatus 700 to perform are the same as those performed in the web server 200 or mail receiving server 300 described with reference to FIG. 1 to FIG. 11, their description will be omitted here.

The programs described above may be stored in an external storage medium. Examples of the storage medium that can be used include the flexible disk 1090, the CD-ROM 1095, an optical recording medium such as a digital versatile disk (DVD) or a phase-change disk (PD), a magneto-optical recording medium such as a magnetic disk (MD), a tape medium, and a semiconductor memory such as an integrated circuit (IC) card. A storage device, such as a hard disk or a RAM, in a server system connected to a private communication network or to the Internet may be used as a recording medium such that the program is provided to the information processing apparatus 700 via the network.

While the present invention has been described using the embodiments, the technical scope of the present invention is not limited to the scope described in the above embodiments. It will be apparent to those skilled in the art that various changes or modifications may be made to the embodiments described above. It is apparent from the appended claims that the embodiments to which such changes or modifications have been made should also be included in the technical scope of the present invention.

What is claimed is:

1. A method for replying to inquiries received from users of an information provision site having a plurality of screens as a customer service, using a web server comprising a web page recording unit for recording each of a plurality of image data in association with identification information of the plurality of screens and a history recording unit; and a reception server comprising an image recording unit in association with identification information of the plurality of screens, comprising:

recording contact addresses on the web server of predetermined operators responsible for responding to inquiries for a model of a user computer terminal;

receiving from the user computer terminal in which a first screen is being displayed, a request for displaying a second screen including an operation object for making an inquiry;

wherein if the user computer terminal is a mobile phone, displaying on a display of the user computer terminal an intensity of radio waves from a base station, an indication of received inquiry messages and current time at the top of the display, and a web page received from the web server in the middle of the display;

generating screen transition information from identification information of the first screen;

obtaining model information regarding the user computer terminal that sent the request for displaying the second screen;

retrieving screen data pertaining to the second screen, said retrieved screen data comprising the operation object for making the inquiry;

inserting the screen transition information and the obtained model information into the retrieved screen data;

updating the screen transition information with identification information of the second screen;

recording an updated screen transition information in the history recording unit;

sending the screen data pertaining to the second screen to the user computer terminal;

starting an inquiry message in response to operation of the operation object from the user computer terminal;

wherein the updated screen transition information and model information are inserted into the inquiry message;

further editing the inquiry message using an editing screen by manually editing a body field of the inquiry message from the user computer terminal;

sending the inquiry message to the reception server;

acquiring a display image and a screen transition diagram corresponding to identification information contained in the updated screen transition information included in the inquiry message in response to the reception of the inquiry message by the reception server and displaying the image and the screen transition diagram that associates the plurality of screens with their transition;

adding a list of frequently asked inquiries with responses to the inquiry message prior to forwarding the inquiry message to one of the predetermined operators; and forwarding the inquiry message to one of the predetermined operators.

* * * * *